US006167498A

United States Patent [19]

Larson et al.

[11] Patent Number: 6,167,498

[45] Date of Patent: Dec. 26, 2000

[54] CIRCUITS SYSTEMS AND METHODS FOR MANAGING DATA REQUESTS BETWEEN MEMORY SUBSYSTEMS OPERATING IN RESPONSE TO MULTIPLE ADDRESS FORMATS

[75] Inventors: Michael Kerry Larson; Timothy James McDonald, both of Austin, Tex.

[73] Assignee: Cirrus Logic, Inc.

[21] Appl. No.: 08/944,946

[22] Filed: Oct. 2, 1997

[51] Int. Cl.[7] .......... G06F 12/00

[52] U.S. Cl. .......... 711/202; 711/203; 711/206

[58] Field of Search .......... 711/202, 203, 711/206, 209; 345/521, 503; 395/800.16

[56] References Cited

U.S. PATENT DOCUMENTS

| | | | |
|---|---|---|---|
| 5,129,070 | 7/1992 | Dorotte | 711/209 |
| 5,200,749 | 4/1993 | Crosby et al. | 341/87 |
| 5,522,027 | 5/1996 | Matsumoto et al. | 345/503 |
| 5,560,030 | 9/1996 | Guttag et al. | 395/800.16 |
| 5,590,311 | 12/1996 | Matsushima | 395/500 |
| 5,664,162 | 9/1997 | Dye | 345/521 |
| 5,850,266 | 12/1998 | Gimby | 348/558 |

*Primary Examiner*—Do Hyun Yoo
*Assistant Examiner*—Nasser Moazzami
*Attorney, Agent, or Firm*—James J. Murphy, Esq.; J. P. Violette, Esq.

[57] ABSTRACT

A process and implementing computer system in which a graphics subsystem 117 having an XY coordinate addressing system interfaces with a host computer system having a linear addressing configuration. The subsystem includes an internal graphics engine 325. The system CPU initiates data fetch and write requests to the host computer system memory 109. A subsystem host-XY circuit processes address requests between the subsystem and the host through the host system bus 105. A host system bus master circuit 315 is included in the subsystem 117 and is responsive to the host-XY circuit to access the host system bus 105 and effect the transfer of requested data through subsystem queuing units 303, 307 to the subsystem host interface bus 301 from which such requested data may be acquired by the graphics engine 325. In an alternate embodiment, the subsystem includes a subsystem master control unit or MCU to enable parallel or simultaneous operation of the Host XY unit and the graphics subsystem MCU.

26 Claims, 4 Drawing Sheets

| (X,Y) | LINEAR |
|---|---|
| (0,0) | 0 |
| (99,1) | 199 |
| (50,2) | 250 |

CIRCUITS SYSTEMS AND METHODS FOR MANAGING DATA REQUESTS BETWEEN MEMORY SUBSYSTEMS OPERATING IN RESPONSE TO MULTIPLE ADDRESS FORMATS

RELATED APPLICATIONS

The present application is related to co-pending applications entitled "HOST DMA THROUGH SUBSYSTEM XY PROCESSING", filed on, assigned to the assignee of the present application, and included herein by reference.

FIELD OF THE INVENTION

The present invention relates generally to information processing systems and more particularly to an improved signal processing method and device for computer graphics systems.

BACKGROUND OF THE INVENTION

The use and application of computer graphics to all kinds of systems and subsystems environments continues to increase to an even greater extent with the availability of faster and faster information processing and retrieval devices. The relatively higher speed of operation of such devices remains a high priority design objective. This is especially true in a graphics system, and even to a greater extent with "3D" graphics systems. Such graphics systems require a great deal of processing for huge amounts of data and the speed of data flow is critical in providing a marketable new product or system, or in designing graphics or other subsystems which may enable and drive new computer applications.

In most data and information processing systems, and especially in computer graphics systems, much time is consumed in accessing data from a memory or storage location, then processing that information and sending the processed information to another location for subsequent access, processing and/or display. As the speed of new processors continues to increase, access time for accessing and retrieving data from memory is becoming more and more of a bottleneck relative to available system speed. Subsystems such as graphics systems must be capable of performing more sophisticated functions in less time in order to process greater amounts of graphical data required by modern software applications. Thus, there is a continuing need for improvements in software methods and hardware implementations to accommodate operational speeds required by an expanding array of highly desired graphics applications and related special video effects.

In modern graphics systems, texture maps are implemented to provide extremely detailed and rich graphics images through the rendering of graphics objects. Texture maps are comprised of texels which are stored and accessed from memory, and rendered in the form of a composite of primitives or graphics objects on a display screen in response to a graphics application program. In general, the more intricate graphics representations require an enormous amount of detail and data to draw upon from the stored texture maps. Advanced graphics programs include mechanisms by which blocks of such data which are more frequently fetched by the program are stored in a relatively fast local memory. In most systems the local memory capacity is limited and much if not most of the texel map data storage is handled by the host system memory. Since the host system memory is generally relatively slower than the local graphics system memory, systems requiring a greater number of accesses to the host memory will be necessarily slower. Accordingly, the more desirable and robust graphics applications, which have more extensive and detailed texture maps will have more data traffic between the host system memory and the graphics device, which will slow down the system operation and tend to detract from the desirability of the more intricate and robust graphics applications.

In general, a high volume of access commands and data traffic between a graphics device and a host system memory causes memory access and data transfer delays which, in turn, result in an overall degradation of system speed. Much of this delay results from latency incurred through normal system CPU processing. Since each access to the system or host memory has required CPU processing, such requests cannot be met immediately if the CPU is occupied with other higher priority system tasks. Moreover, when the subsystem requests to the system CPU are sequential and conditioned upon the prior subsystem request being completed, such as is the case when graphics applications request the transfer of a series of polygons, additional system delays and CPU wait conditions are introduced. However, for large data transfers, such as screen background transfers, CPU parallel participation in the data transfers would be desirable. Much of the information transfer delay time may be obviated by an improved information transfer implementation which makes greater use of parallel or asynchronous information processing techniques.

Accordingly, there is a need for an enhanced method and processing apparatus which is effective to improve the speed and efficiency of information transfers between a graphics device and a host memory and to optimize CPU participation in such transfers.

SUMMARY OF THE INVENTION

A method and implementing system are provided in which subsystem information requests and information transfers between the subsystem and a host system are processed substantially by subsystem units which determine corresponding host linear memory addresses for subsystem XY addresses and corresponding subsystem XY addresses for host linear addresses, and extents of address transfers, off-line from the host CPU time. One exemplary embodiment includes a host interface bus and interface bus controller, which interfaces between a subsystem or graphics engine and a host system memory and CPU, to translate and identify corresponding addresses for address requests between the host linear addressing scheme and the graphics subsystem X-Y addressing schemes. A subsystem address processing methodology off-loads substantial CPU functionality to the subsystem and allows maximum availability of the CPU to larger data transfer requests from the subsystem. In one embodiment which includes a subsystem MCU, a CPU initiates and directly interfaces with the subsystem registers thereby enabling simultaneous operation of a Host XY and graphics subsystem master control unit.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
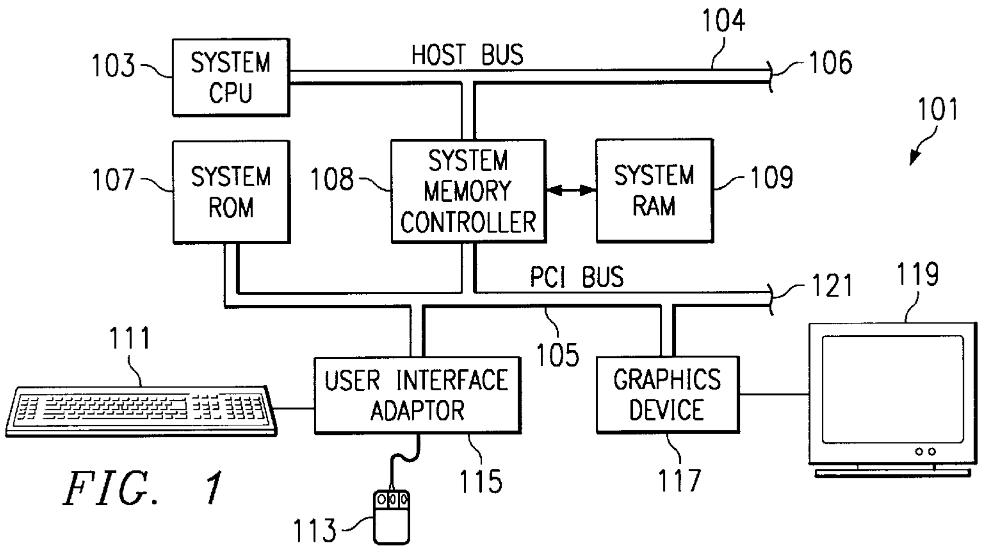
FIG. 1 is a block diagram of a computer system including a graphics subsystem.

With reference to FIG. 1, the various methods discussed above may be implemented within a typical computer system or workstation 101. An exemplary hardware configuration of a workstation which may be used in conjunction with the present invention is illustrated and includes a central processing unit (CPU) 103, such as a conventional microprocessor, and a number of other units interconnected through a system bus 105, which may be any host system bus. For purposes of the present disclosure, the system bus shown in the exemplary embodiment is a so called "PCI" bus but it is understood that the processing methodology disclosed herein will apply to future bus configurations and graphics ports as well, including but not limited to AGP. The bus 105 may include an extension 121 for further connections to other workstations or networks, other peripherals and the like. The workstation shown in FIG. 1 includes system random access memory (RAM) 109, and a system memory controller 107. The system bus 105 is also typically connected through a user interface adapter 115 to a keyboard device 111 and a mouse or other pointing device 113. Other user interface devices may also be coupled to the system bus 105 through the user interface adapter 115. A graphics device 117 is also shown connected between the system bus 105 and a monitor or display device 119. Since the workstation or computer system 101 within which the present invention is implemented is, for the most part, generally known in the art and composed of electronic components and circuits which are also generally known to those skilled in the art, circuit details beyond those shown in FIG. 1, will not be explained to any greater extent than that considered necessary as illustrated above, for the understanding and appreciation of the underlying concepts of the present invention and in order not to obfuscate or distract from the teachings of the present invention.

Figure 2:
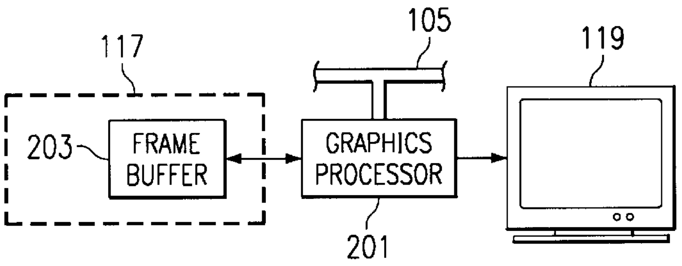
FIG. 2 is block diagram of the graphics device shown in FIG. 1.

In FIG. 2, the system bus 105 is shown connected to the graphics device 117. The graphics device is representative of many subsystems which may be implemented to take advantage of the benefits available from an implementation of the present invention. The exemplary graphics device 117 includes a graphics processor 201 which is arranged to process, transmit and receive information or data from a graphics memory unit 203. The graphics memory 203 may include, for example, an RDRAM frame buffer unit for storing frame display information which is accessed by the graphics processor 201 and sent to the display device 119. The display device 119 is operable to provide a graphics display of the information stored in the frame buffer as processed by the operation of the graphics processor 201.

Figure 3:
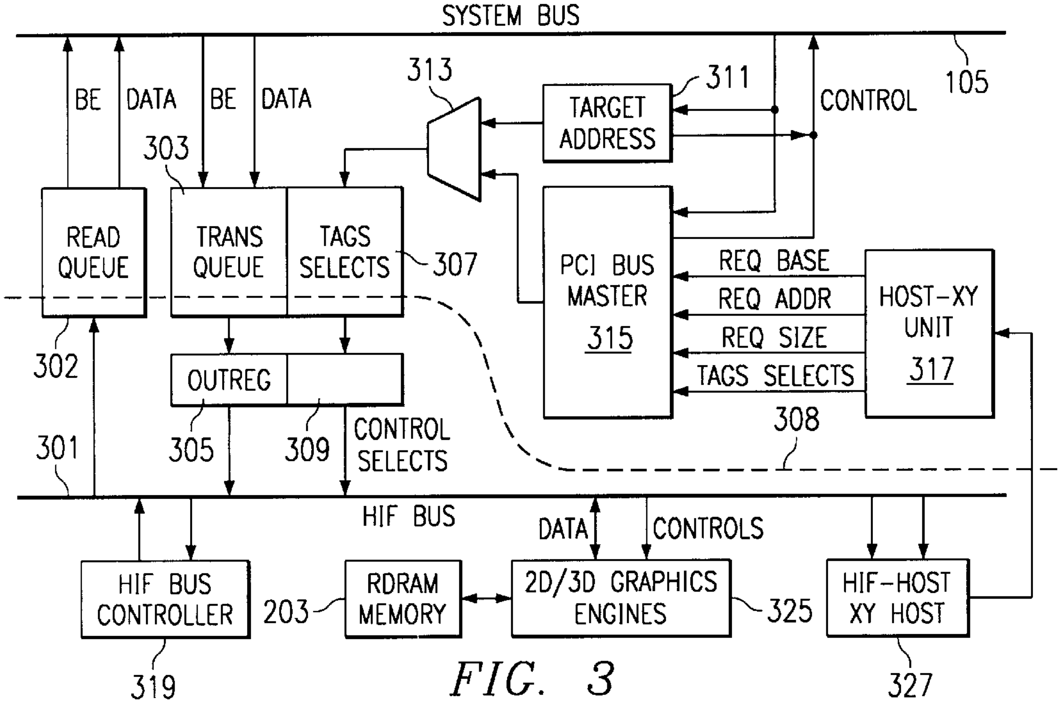
FIG. 3 is a block diagram showing selected component functional sections of the graphics processor device illustrated in FIG. 2.

In FIG. 3, the major blocks of the graphics processor 201 are illustrated. A graphics unit host interface bus (HIF bus) 301 is connected through a READ QUEUE circuit 302 to the System or PCI bus 105 and applies Byte Enable BE and DATA signals to the PCI bus 105. BE ands DATA signals are also applied from the host bus 105 through a transaction queue 303 and output registers 305 to the HIF bus 301. An HIF bus controller circuit 319 is arranged to apply control signals to the HIF bus 301. The RDRAM memory unit 203 is also coupled directly to the 2D/3D engines 325. The 2D/3D engine is also coupled to the HIF bus 301 for sending and receiving data and some register-related control signals.

In an alternate embodiment (not shown) illustrated in the above cross-referenced application, the HIF bus controller 319 is also coupled to a MC HIF Master and HIF bus controller circuit or MCU to receive request signals REQ and send back GRANT signals. The Master Control HIF Master circuit in the co-pending application is arranged to send signals to and receive signals from the HIF bus 301, and also to receive signals from a Master Control Unit MCU which is connected between the graphics engines 325 and the MCU. The MCU is arranged to receive signals from a graphics 2D/3D engine 325 and also to send signals to the RDRAM memory unit 203.

A Host Interface to Host XY (HIF-HOST XY) unit 327 connects the HIF bus 301 to a Host XY unit 317. The HIF Host XY unit 327 includes BASE ADDRESS, START X-Y, EXTENT X-Y and BYTE PITCH registers (not shown). The Host XY unit 317 includes a state machine and additional registers to track variables Y_CURRENT, X_COUNT and REQ_ADDR. The Host XY unit 317 applies Request Base (REQ BASE), Request Address (REQ ADDR), Request Size (REQ SIZE) and TAGS and SELECTS signals to a Bus Master circuit 315. The Bus Master circuit 315 applies an output signal to one input of a two input multiplexer circuit 313 which, in turn, applies an output signal to a TAGS and SELECT register 307. The TAGS SEL circuit is connected through a CONTROL SELECTS circuit 309 to the HIF bus 301.

A Target Address circuit 311 receives an input from the system bus 105 and provides the other input to the multiplexer circuit 313. The Target Address circuit 311 and the Bus Master circuit 315 are also arranged to apply output signals to the system bus 105. A clock line 308 has been illustrated to show that several of the graphics units have portions that are running at a system or host clock speed and portions that are operating at subsystem or graphics clock speed. In general, the subsystem clock speed will be operating at a much higher rate than the host or system clock. The differing clock speeds will allow the graphics subsystem to process information asynchronously and at a much faster rate than the host CPU, but also requires certain synchronization precautions and interfacing with the host bus and the host system in general. As illustrated in FIG. 3, the subsystem units above the time line 308 are operating at the speed of the host clock and the subsystem units below the time line 308 are operating at the faster speed of the subsystem or graphics clock.

Within the graphics device 201, information describing various aspects of the pixels to be displayed on the display device 119 are stored in the RDRAM frame buffer memory 203. The 2D/3D engine 325 operates to effect changes in the images displayed on the display 119 and as those images change, data is constantly being read from and written to the graphics texture maps which may be stored in the graphics unit RDRAM memory 203 or the system or host memory 109. Although the graphics device deals with data through an addressing scheme organized in an XY configuration, the host memory data may be arranged in a single block of contiguous linear memory or it may be arranged in an XY format with a fixed pitch in bytes per line.

The subsystem illustrated in the present example may read or write in both XY and linear modes of operation. The operation of the subsystem illustrated in FIG. 3 is explained in connection with the various selected functions which are performed by the subsystem including an XY "write" transfer from host memory, an XY to linear conversion process, a linear to linear address generation and an engine "read" from host memory request.

Figure 4:
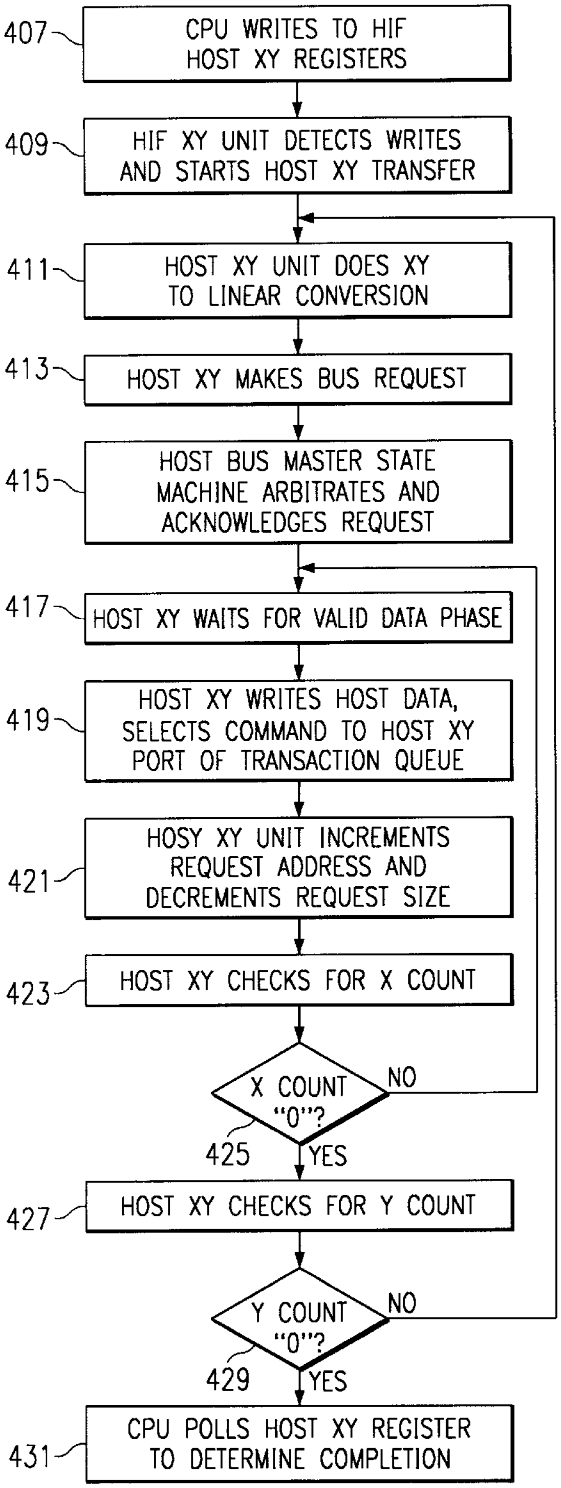
FIG. 4 is a flow chart illustrating an exemplary functional flow for XY transfer transactions between the graphics subsystem and a host system.

FIG. 4 illustrates a typical Host XY transfer operation. The CPU 103, responsive to graphics driver software, initiates the transfer by obtaining access to the HIF bus 301. After obtaining access, the CPU 103 issues an HIF "write" command 407 to the HIF Host XY Registers 327. The HIF XY unit 317 detects the "writes" and starts the Host XY transfer 409. The HIF-Host 327 and HOST-XY 317 circuits accomplish a XY to linear conversion 411, calculates a linear address for each transfer requested, and keeps track of the current address for each data phase. The tracking is required because a slaved device may discontinue a burst at any time and the correct address will be needed when the PCI master automatically retries the cycle. For XY transfers, the Host XY unit 317 receives a starting XY pair, X and Y extents, and a host pitch in bytes. The XY to linear conversion is done 411 for the given coordinates and pitch. Then a PCI request of the given X extent will be made 413. A Host PCI State Machine (not shown) arbitrates and acknowledges the request 415 and the HOST XY unit 317 will wait for a valid PCI data phase 417. The HOST XY 317 will then write Host Data, Selects Command to Host XY port of the transaction queue 303. The Host XY unit 317 then increments the request address and decrements the request size 421. When the complete X extent has been transferred, the Y address will be incremented 421, the next linear address will be calculated, and the next X extent request will be made. That process is repeated 427 until the Y extent has been reached 429. A status bit in a HOST XY register is set when the Y count is zero. The CPU 103 through polling, may then detect the change in the status bit, to determine when the transfer has completed 431.

When a "write" to host memory is requested, the Host XY unit 317 writes the proper "selects" and address for an HIF cycle read from the engine in the host clock domain. Then the Host state machine starts an internal HIF read cycle which is effective to read data from the engine 325 and put it into the Read Queue 302. When the PCI Bus Master 315 detects that the Read Queue 302 is not empty, it will request the PCI bus and begin the PCI cycle as soon as access to the bus is granted. The PCI Bus Master 315 must wait until there is data in the Read Queue 302 to make its request because the PCI standard specifies a minimum number of cycles between the time that a PCI Bus Master 315 is granted the bus and the time that it completes its first data phase. The Host XY unit 317 waits for the write done signal from the PCI Bus Master 315 to begin the next Host XY transfer.

The host XY unit 317 calculates a linear address for each data transfer and keeps track of the current address for each data phase. This is done since a slave unit may discontinue a burst at any time and the correct address will be needed when the PCI Bus Master 315 automatically retries the cycle.

For XY transfers, the host XY unit 317 receives a starting XY pair, X and Y extents, and a host pitch in bytes. An XY to linear conversion will be done for the given coordinates and pitch. Then a PCI request of the given X extent will be made. When the complete X extent has been transferred, then the Y address will be incremented. The next linear address will be calculated and the next X extent request will be made. The process is repeated until the Y extent has been reached.

Figure 5:
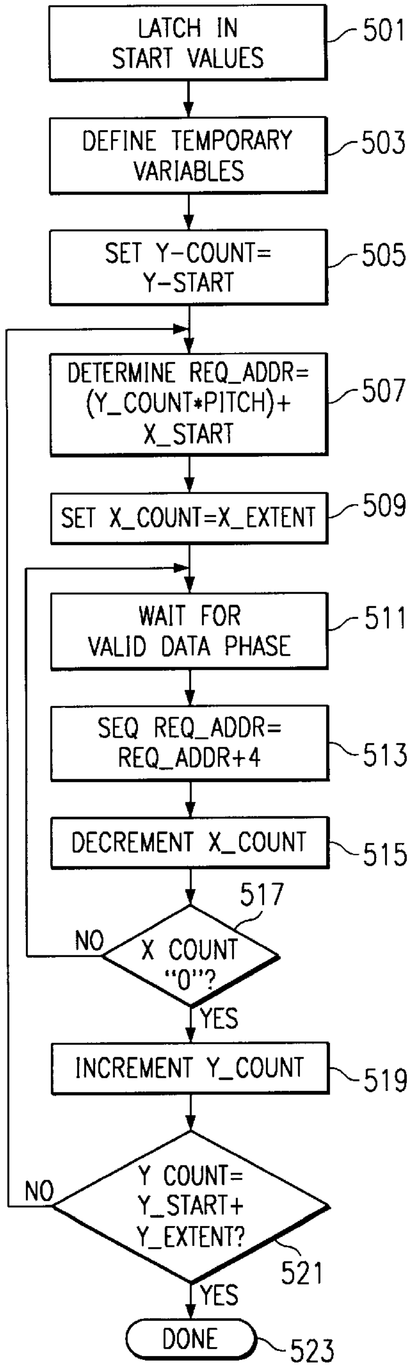
FIG. 5 is a flow chart illustrating an exemplary XY to linear conversion process.

FIG. 5 illustrates the XY transfer flow in more detail. Initially the START values are latched in 501. Next temporary variables are defined 503 and the $Y_{13}$ COUNT is set as the given Y START 505. Next the requested address is determined by multiplying the Y COUNT times the pitch plus the X START 507. X_COUNT is then set as X_EXTENT 509 and a valid PCI data phase is awaited 511. Next the requested address "REQ ADDR" is set to "REQ ADDR+4" 513 and the X_COUNT is decremented 515. The process is cycled 517 until the X_COUNT is equal to "0", at which time the Y_COUNT is incremented 519. If the Y_COUNT does not equal the Y_START+Y_EXTENT, the process is returned to the Determine Requested Address step 507. When Y_COUNT does equal Y_START+Y_EXTENT 521, then the process is completed 523.

Figure 6:
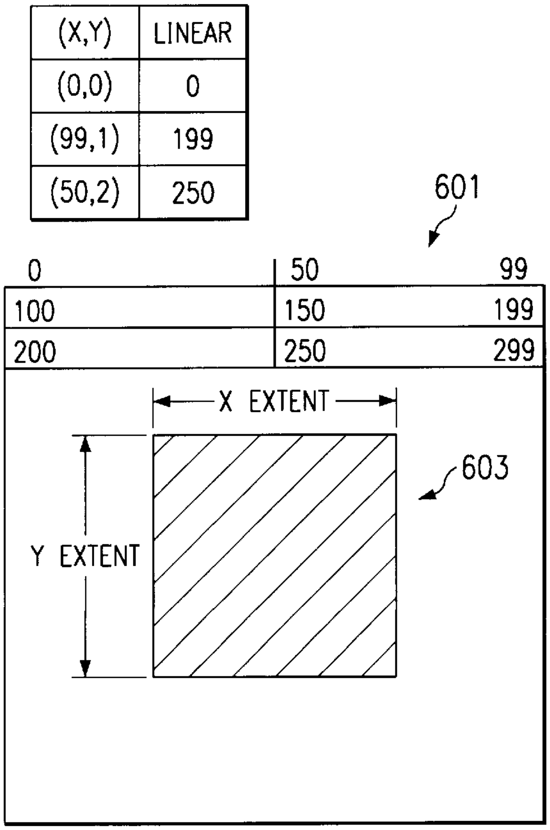
FIG. 6 is an illustration of an exemplary subsystem memory map storage configuration.

The relationship between XY addressing in the graphics system and the linear addressing of the host system is illustrated in FIG. 6. As earlier noted, address in the graphics system are referenced in terms of X and Y coordinates 603 and X and Y extents relative to an XY origin 601. The host memory system on the other hand is addressed in terms of a physical address and a host pitch. The translation between the two systems is accomplished by the programming of the Host XY unit 317.

For linear transfers between the graphics subsystem 117 and the host system through a system bus 105, the Host XY unit 117 receives an offset address and a length in bytes to be transferred. The length may be up to 1 Megabyte (1MB) in multiples of DWORDS. The host XY unit will translate the given length into a series of XY transfers from the offset address. The Y extent will be equal to the length divided by 2048 bytes in the present example. The X extent will be 2048 bytes until the Y extent is zero. For the final transfer (or the first if the length is less than 2048 bytes) the X extent will be the remainder of the length divided by 2048.

Figure 7:
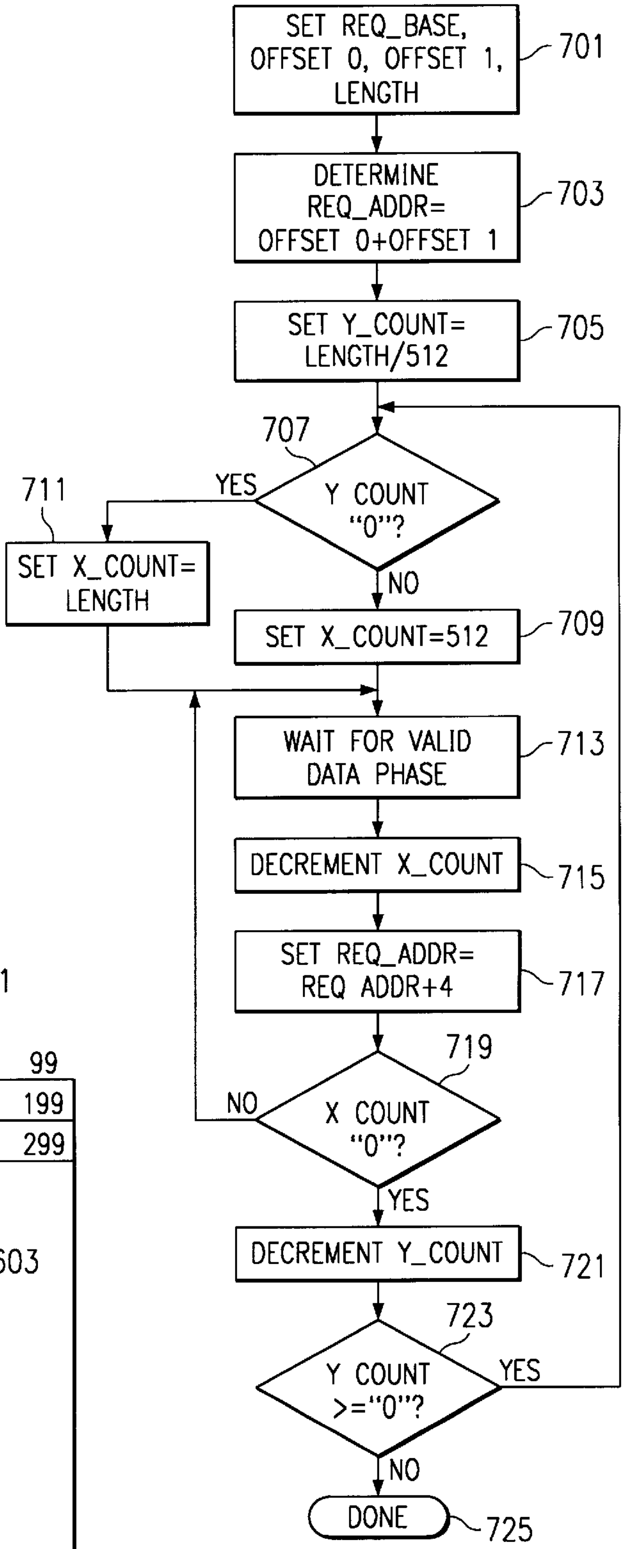
FIG. 7 is a flow chart illustrating an exemplary linear-to-linear address generator operation.

If the length is less than 2048 bytes, a single transfer with an X extent equal to the length will be performed. The linear transfer methodology is illustrated in more detail in FIG. 7. Initially, the request base REQ_BASE, first offset (OFFSET 0), second offset (OFFSET 1) and LENGTH of the transfer are set into registers 701 and the requested address REQ_ADDR is determined 703. Next, the Y_COUNT is set equal to the LENGTH 705. If the Y_COUNT equals "0" 707 then the X_COUNT is set 711 equal to the LENGTH, otherwise the X_COUNT is set 709 equal to "512". After waiting for a valid data phase 713, the X_COUNT is decremented 715 and the REQ_ADDR is set 717 equal to the REQ_ADDR plus "4". The previous three steps 713, 715 and 717, are repeated until the X_COUNT is equal to zero 719. The Y_COUNT is then decremented 721 and the process repeats from the "Y_COUNT=0" stage 707 until the Y_COUNT is detected to be not greater than or equal to zero 723 at which point, the process ends 725.

When the 2D/3D engine requests a read from host memory, the host XY unit 317 control of the host PCI Bus Master 315, which, in turn, requests the PCI or system bus 105 and performs a PCI read cycle from the host. When host data is returned, the data is written to the transaction queue 303 along with the correct Byte Enables BE, Selects and Tags. Once in the transaction queue 303, 307, the host state machine (SM) INTCTL_SM reads the data out and creates the appropriate HIF write cycle.

Figure 8:
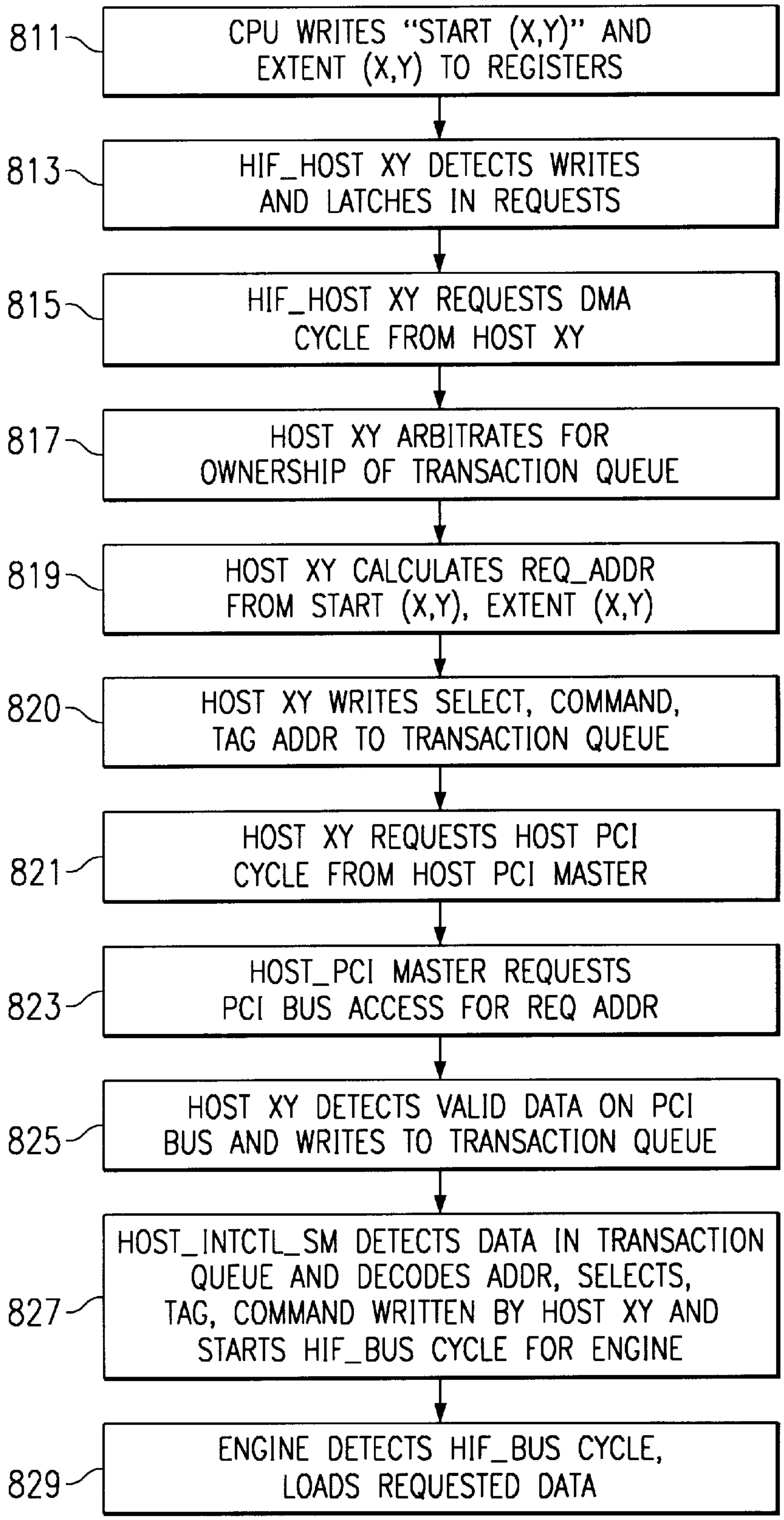
FIG. 8 is a flow chart illustrating an exemplary method for accomplishing a "read" request from a graphics engine.

The flow for the read from host request is shown in more detail in FIG. 8. The CPU 103 writes the START X,Y and EXTENT XY 811 to HIF Host XY registers. The HIF Host XY unit 327 then detects those writes and latches in those requests 813. The HIF Host XY unit 327 then requests a DMA cycle 815 from the Host XY unit 317. The Host XY unit 317 will then arbitrate for ownership 817 of the transaction queue 303. The Host XY unit determines the REQ__ADDR from START__XY and EXTENT__XY 819 and writes 820 Select, Command and Tag address to the transaction queue 303, 307. The Host XY unit 317 then requests a host PCI cycle 821 from the Host PCI Bus Master 315. The Host PCI Bus Master 315 then requests a PCI Bus access 823 for the requested address REQ__ADDR. The Host XY unit 317 then detects valid data on the PCI bus 105 and writes the data 825 to the transaction queue 303, 307. Next the Host__INTCTL__SM detects data 825 in the transaction queue 303, 307, decodes the ADDR, Select, and Tag commands written by the Host XY unit 317 and starts a HIF__BUS cycle 827 for the 2D/3D engine 325. The 2D/3D engine 325 detects the HIF__BUS cycle and loads the requested data 829.

In implementations such as that illustrated in the above-referenced related application, which include a subsystem control unit or MCU, when the HOST XY unit 317 operates independently from the MCU, it is possible to achieve parallelism between the HOST XY unit 317 and the MCU when storing or fetching host data. In normal Host XY transfers, the HOST XY unit 317 is slaved to the subsystem MCU. In that arrangement, the Host XY unit 317 will never attempt an information transfer larger than the SRAM it is sourcing or sinking. When the MCU has made the request, it will remain idle until the HOST XY unit 317 has completed its operation. In Master I/O mode, the HOST XY unit 317 is programmed independently of the subsystem MCU (not shown). The engine 325 is set up to sink or source data from the "Host Data" port, and the Host XY unit 317 and the subsystem MCU unit operate in parallel. The HOST XY unit 317 will fetch or store data as fast as the PCI bus can accept the data.

Simultaneously, the MCU will be accessing RDRAM to store or fetch the data. Since the engine 325 and the RDRAM 203 have much more bandwidth than the PCI bus 105, data throughput will be limited only by the available PCI bandwidth.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a CPU or other larger system integrated circuit or chip. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. For use in connection with an information processing system including at least one host CPU and a host memory, said host memory being addressable in a first addressing format, and a subsystem for performing a predetermined aspect of information processing operations being performed by said information processing system, said subsystem including a subsystem memory section addressable in a second addressing format, a method for implementing a data storage and retrieval process for managing data requests in said second format to read and write information between said information processing system and said subsystem, said method comprising:

generating a data read request from the host CPU for a data read transaction between the subsystem and the host memory, said request being presented as a requested address in said second addressing format;

calculating within said subsystem an equivalent host memory target address in said first addressing format equivalent to said request in said second format;

accessing a host memory location at the host memory target address;

transferring data between said host memory location at the host memory target address and said subsystem in response to said data read request; and storing said host memory target address until said accessing step is completed.

2. The method as set forth in claim 1 wherein said data read request is a data write request from said subsystem to said host memory.

3. The method as set forth in claim 2 and further including:

storing said data read request within said subsystem until said data read request is accessed by said host CPU.

4. The method as set forth in claim 1 wherein said subsystem is a video graphics device.

5. The method as set forth in claim 1 wherein said first addressing format is a linear addressing format.

6. The method as set forth in claim 1 wherein said second addressing format is a coordinate addressing format.

7. The method as set forth in claim 6 wherein said first addressing format is a linear addressing format.

8. The method as set forth in claim 1, wherein, after said step of generating, said method includes:

determining whether said requested address is stored in said subsystem memory section; and calculating said equivalent host memory target address only if it is determined that said requested address is not stored in said subsystem memory section.

9. The method as set forth in claim 1 wherein said generating step includes:

presenting said requested address in terms of a start coordinate address, an X coordinate extent and a Y coordinate extent.

10. The method as set forth in claim 9 wherein said first addressing format comprises a linear addressing scheme, said data read request being fulfilled through sequential data transfers from said equivalent host target memory address to said subsystem.

11. The method as set forth in claim 10 and further including:

determining, after each sequential data transfer, whether the entire data read request has been completed.

12. The method as set forth in claim 11 and further including:

continuing said reading of data between said host memory target address and said subsystem in response to said data read request until the entire data read request has been completed.

13. A subsystem for use with a host computer system, said host computer system including at least one host CPU and a host memory, said host memory being addressable in a first addressing format, said subsystem including a subsystem memory section addressable in a second addressing format, said subsystem being selectively operable for implementing a data storage and retrieval process for managing subsystem requests in said second format to read and write information between said host computer system and said subsystem, said host CPU being selectively operable for generating a data transfer request for a data transfer transaction between the subsystem and the host memory, said request being presented as a requested address in said second addressing format, said subsystem including:

an address format translation device selectively operable in response to said data transfer request for calculating an equivalent host memory target address in said first addressing format equivalent to said request in said second format;

a control device connected to said address format translation device, said control device being selectively operable for accessing said the host memory target address;

means for transferring data between a host memory location at said host memory target address and said subsystem in response to said data transfer request;

means for calculating whether said requested address is stored in said subsystem memory section; and means for determining said equivalent host memory section target address only if it is determined that said requested address is not stored in said subsystem memory.

14. The subsystem as set forth in claim 13 wherein said data transfer request is a data read request from said subsystem to said host memory.

15. The subsystem as set for in claim 14 and further including:

a temporary storage device connected to said address format translation device, said temporary storage device being operable for storing said host memory target address until said accessing is completed.

16. The subsystem as set forth in claim 13 wherein said data transfer request is a data write request from said subsystem to said host memory.

17. The subsystem as set forth in claim 16 and further including:

a storage device operable for storing said data transferred within said subsystem until said data transferred is accessed by said host CPU.

18. The subsystem as set forth in claim 13 wherein said subsystem is a video graphics device.

19. The subsystem as set forth in claim 13 wherein said first addressing format is a linear addressing format.

20. The subsystem as set forth in claim 13 wherein said second addressing format is a coordinate addressing format.

21. The subsystem as set forth in claim 20 wherein said first addressing format is a linear addressing format.

22. The subsystem as set forth in claim 13 wherein said requested address is presented in terms of a start coordinate address, an X coordinate extent and a Y coordinate extent.

23. The subsystem as set forth in claim 22 wherein said first addressing format comprises a linear addressing scheme, said data transfer request being fulfilled through sequential data transfers from said equivalent host target memory address to said subsystem.

24. The subsystem as set forth in claim 23 and further including:

a transfer completion checking device for determining, after each sequential data transfer, whether the entire data transfer request has been completed.

25. The subsystem as set forth in claim 24 and further including:

means effective to continue said transferring of data between said host memory target address and said subsystem in response to said data transfer request until the entire data transfer request has been completed.

26. A computer based information processing system comprising:

a main system bus;

a host CPU connected to said main system bus;

a host memory coupled to said main system bus, said host memory being addressable in a first addressing format;

a display device;

a graphics subsystem connected between said main system bus and said display device, said graphics subsystem being selectively operable for implementing a data storage and retrieval process for handling host CPU requests for storage and retrieval of information between said host memory and said graphics subsystem, said host CPU being selectively operable for generating a data transfer request for a data transfer transaction between the graphics subsystem and the host memory, said request being presented as a requested address in second addressing format, said graphics subsystem further including:

an address format translation device connected to a subsystem processor device, said address format translation device being selectively operable in response to said data transfer request for calculating an equivalent host memory target address in said first addressing format equivalent to said request in said second format;

a control device connected to said address format translation device, said control device being selectively operable for accessing said the host memory target address;

means for transferring data between said host memory target address and said graphics subsystem in response to said data transfer request;

means for calculating whether said requested address is stored in a subsystem memory; and means for determining said equivalent host memory target address only if it is determined that said requested address is not stored in said subsystem memory.

* * * * *

UNITED STATES PATENT AND TRADEMARK OFFICE

CERTIFICATE OF CORRECTION

PATENT NO. : 6,167,498 
DATED : December 26, 2000
INVENTOR(S) : Larson et al.

It is certified that error appears in the above-identified patent and that said Letters Patent is hereby corrected as shown below:

Column 6,
Line 8, after “503 and the Y” delete “13,” and insert -- _ --;
Line 42, after “will be performed.” insert -- ¶ --

Column 8,
Line 56, after “teach sequential data” delete “transfer” and insert -- read --
Line 57, after “the entire data” delete “read” and insert -- transfer --; and Column 9,
Line 29, after “memory” insert -- section --;

Signed and Sealed this

Fourteenth Day of September, 2004

JON W. DUDAS
*Director of the United States Patent and Trademark Office*